3,428,297
STEM CONSTRUCTION FOR RISING-STEM GATE VALVES

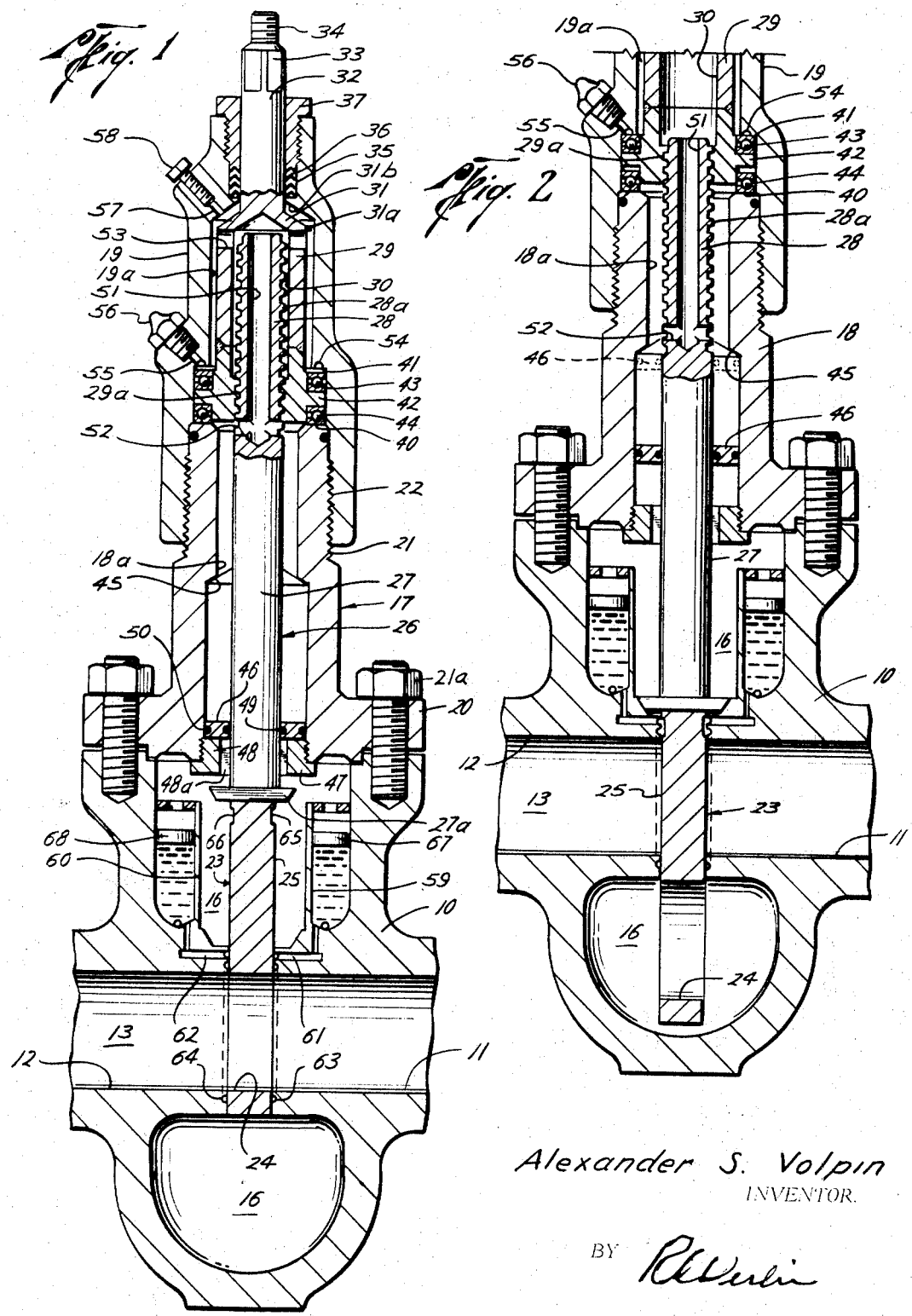

Alexander S. Volpin, 10200 W. Broadview Drive, Miami Beach, Fla. 33154
Filed Jan. 23, 1967, Ser. No. 611,094
U.S. Cl. 251—355                                11 Claims
Int. Cl. F16k *3/16, 31/30, 25/02*

ABSTRACT OF THE DISCLOSURE

Stem construction for rising-stem gate valves including a threaded operator connection to the stem immersed in a body of sealing lubricant which is maintained by line pressure to prevent incursion of line fluids about the operator connection and to automatically balance end forces on the stem.

Background of the invention

This invention relates to rising-stem gate valves and more particularly to improvements in the construction of the operating stem for such valves.

Conventional rising-stem gate valves, particularly large diameter valves such as are employed in controlling large diameter, high pressure, oil and gas pipelines, are usually subject to large internal fluid pressure forces acting on the operating stems, the end portions of which are unbalanced to atmosphere causing difficulty in operation or requiring excessive amounts of operating power. Also, in such large valves, the stem displacement when moving inwardly of the valve casing becomes a significant factor in connection with the power required to move the gate inwardly. In gates having upstream and downstream closure segments, this displacement often causes a hydraulic pressure lock in the valve housing, which prevents the gate being moved to its full seating terminal position.

Moreover, in such more conventional gate valves, threaded drive elements are employed between the stem and operator which are exposed to line fluids and accompanying detritus, such as sand, scale and other foreign matter, which may cause abrasion or other deleterious action on the threaded operating elements.

Summary of the invention

The stem construction in accordance with a preferred embodiment of this invention contemplates rotatable drive elements threadedly connecting the stem to an operator; a bonnet section defining a chamber enclosing the drive elements and filled with a body of a plastic or flowable lubricant immersing the drive elements; and an annular barrier member slidably disposed about the stem inside the chamber forming a movable end wall beneath, and bearing against, the body of lubricant and exposed to line pressure in the valve housing, whereby to automatically maintain the body of lubricant about the drive elements so as to prevent incursion of line fluid to the drive elements, and to balance the fluid end forces acting on the stem.

Accordingly, it is a primary object of this invention to provide an improved stem construction for rising-stem gate valves which obviates the aforementioned difficulties of more conventional valves.

Important objects are to provide means for maintaining a lubricant seal about the threaded drive connection between the stem and operator which will prevent incursion of line fluid and any accompanying foreign matter into the drive connection; which will balance the fluid end forces acting on the stem; which will volumetrically compensate for stem displacement during its inward movement; and which will permit repacking the drive connection under line pressure in all positions of the gate member.

Other and more specific objects and advantages of this invention will become more readily apparent from the following detailed description when read in conjunction with the accompanying drawing which illustrates a useful embodiment in accordance with this invention.

In the drawing:

FIG. 1 is a longitudinal sectional view of a gate valve employing a stem construction in accordance with this invention showing the parts in the flowway-open position of the gate; and FIG. 2 is a view similar to FIG. 1 showing the parts in the positions occupied in the flowway-closed position of the gate.

Referring to the drawing, there is shown a through-conduit type gate valve of generally conventional form comprising a housing 10 having opposed flow ports 11 and 12 forming the flowway 13 which is intersected interiorly of the housing by the gate chamber 16, the inner ends of flow ports 11 and 12 defining the spaced-apart opposed annular gate seats 14 and 15, respectively.

The upper end of housing 10 is closed by a bonnet, designated generally by the numeral 17, comprising a lower portion 18, having a bore 18a, and an upper portion 19 separably connected thereto and having a coaxial bore 19a. Lower portion 18 is provided about its lower end with an annular bolt flange 20 for connecting the bonnet to the upper end of housing 10 by means of bolts 21a. The upper end of bonnet section 18 is externally threaded at 21 to be received in an internally socket 22 formed by the lower end of upper bonnet section 19.

A through-conduit type gate member, designated generally by the numeral 23, is mounted for reciprocation in gate chamber 16 between seats 14 and 15. The gate member is provided adjacent its lower end with a through-conduit opening 24 and has an upper imperforate segment defining the closure portion 25—25. It will be understood that when the gate member is moved to an upper position, opening 24 will be in registration with flowway 13, as illustrated in FIG. 1, and when moved to a lower position, as seen in FIG. 2, closure portion 25 will intersect flowway 13 to close off fluid flow through the latter.

Gate member 23 is operably connected to an operating stem, designated generally by the numeral 26, which extends axially through bores 18a and 19a of the bonnet.

Stem 26 comprises a lower smooth cylindrical portion 27 carrying an enlarged head 27a on its lower end for operably connecting the stem to the upper end of gate member 23, and an upper section 28, provided with external threads 28a, which is telescopically received in the bore 30 of a drive sleeve 29, provided near its lower end with matching threads 29a, and rotatably mounted in bore 19a of upper bonnet section 19. The upper end of bore 30 is closed by an end wall 31 which carries a cylindrical extension 32 smaller in diameter than sleeve 29 to define the upwardly facing shoulder 31a. Extension 32 projects from the upper end of bonnet section 19 and carries on its outer end means, such as a polygonal section 33 and a threaded pin 34, for attachment to a suitable and generally conventional form of manual or power operator (not shown) for rotating drive sleeve 29.

The upper portion of bore 19a is reduced in diameter to define the downwardly facing internal shoulder 31b opposing shoulder 31a and adapted to form a stop to limit outward movement of sleeve 28. The outer end of the reduced diameter portion of bore 19a is counterbored to form the stuffing box 35, through which extension 32 extends, and which is adapted to contain packing 36 compressed into sealing engagement about extension 32 by means of a gland bushing 37 threadedly received in stuffing box 35.

The upper end of lower bonnet section 18 which is threadedly received in the lower end of bore 19a forms an upwardly facing annular shoulder 40 and bore 19a is provided with a downwardly facing annular shoulder 41 axially spaced from shoulder 40. The lower end of sleeve 29 is provided with an annular bearing flange 42 which extends laterally between shoulders 40 and 41. Upper and lower anti-friction bearings 43 and 44 are arranged about the exterior of sleeve 29 above and below flange 42, the overall longitudinal length defined by the composite bearing section comprising flange 42 and bearings 43 and 44 being slightly less than the longitudinal distance between shoulders 40 and 41 whereby to permit a small amount of relative longitudinal movement between the bearing section and the bonnet, for purposes to be described hereinafter. Except for this limited movement the bearing section cooperates with shoulders 40 and 41 to hold drive sleeve 29 against longitudinal movement while it is rotated to effect reciprocation of stem 26 in operating gate member 23.

Bore 18a is counterbored from its lower end to define a downwardly facing internal shoulder 45 at a point intermediate the ends of bore 18a. An annular piston 46 is slidably disposed about stem portion 27 for movement relative to the latter between shoulder 45 and a stop bushing 47 screwed into the lower end of bore 18a and provided with an axial opening 48 appreciably larger in diameter than stem portion 27 to provide substantial clearance therebetween. Opening 48 may be provided with radial ribs 48a for centering stem 23 in its movement through the opening. Piston 46 is provided with internal and external packings 49 and 50, respectively, to provide fluid-tight slidable seals with stem portion 27 and wall of bore 18a, respectively.

The portions of bores 18a and 19a extending between the seals formed by stuffing box packing 36 and piston 46 comprise a chamber adapted to be filled with a suitable plastic or flowable lubricant material in which the corresponding stem portions and drive sleeve 29 will be immersed as will be described subsequently.

Upper stem portion 28 is provided with an axial channel 51 which communicates with a passage 52 extending transversely through lower stem section 27 at a point just below threads 28a and communicating with the interior of bore 18a. Drive sleeve 29 is provided with ports 53 at points just below end wall 31 providing communication between bore 30 and the annular space above the bearing section between sleeve 29 and the wall of bore 19a.

An annular groove 54 is provided in the face of shoulder 41 and is in communication with a passage 55 connecting with a conventional grease fitting 56, mounted in the wall of bonnet portion 19, and through which lubricant may be introduced into the interior of bonnet 17.

A vent passage 57 extends through the wall of bonnet portion 19 and provides communication between the interior of bore 19a and the exterior of bonnet 17. A plug 58 is threadedly inserted in the outer end of passage 57, being removable for purposes to be described hereinafter.

The gate valve, in accordance with the illustrative embodiment, is of the well-known automatic lubricant-sealed type, being provided with sealant reservoirs 59 and 60 communicating respectively with seats 14 and 15 through passages 61 and 62 leading to the respective seat faces. The latter are provided with annular sealant-receiving grooves 63 and 64, respectively, while the opposite faces of gate portion 25 are provided with so-called jumper recesses 65 and 66 for communicating the related passages 61 and 62 with their corresponding grooves 63 and 64 when the gate member is in the flowway-closing position shown in FIG. 2. Reservoirs 59 and 60 are fitted with slidable barriers 67 and 68 which are responsive, in the known manner, to line fluid pressure differentials across the valve, when the gate member is in the flowway-closing position, to urge sealant from a reservoir to the appropriate sealing groove.

It will be understood that although the illustrative embodiment illustrates a gate valve of the automatic lubricant sealed type, the stem construction in accordance with the present invention is also applicable to rising-stem gate valves of the non-lubricated type, the details of the gate sealing features and elements forming no part of the present invention.

In operation, starting with the gate member in the full open position (FIG. 1), lubricant will be introduced through fitting 56 and passage 55 in an amount sufficient to fill the interior of the bonnet. The lubricant will flow via groove 54 into bore 19a, thence through ports 53 into channel 51 from which the lubricant will move through passage 52 into bore 18a. As more lubricant enters the bonnet it will force piston 46 downwardly until it is stopped by bushing 47. The lubricant will also fill bore 30 of drive sleeve 29 and as a result the threads in the drive connection and the related parts of the stem will be fully immersed in the body of lubricant which fills the interior of the bonnet. Piston 46 will form a movable closure wall for the body of lubricant, sealing it off from the interior of the valve housing and thereby preventing incursion of line fluid to the threaded drive connection and bearing section of the latter.

Moreover, the line fluid pressure acting against the lower face of piston 46 will urge the latter upwardly so as to force lubricant into any voids in the body thereof which may occur as a result of leakage or otherwise in the operation of the valve.

When drive sleeve 29 is rotated in a direction to move stem 26 downwardly to move gate member 23 downwardly to the flowway-closing position (FIG. 2), the downward movement of the stem will cause a pressure drop in the bonnet interior above piston 46. The resulting unbalance will force piston 46 upwardly displacing lubricant into the void spaces formed by the downward movement of the stem, particularly the portion of bore 30 of the drive sleeve above the upper end of stem section 28.

The volume of lubricant thus displaced by the upward movement of piston 46 will compensate for the volumetric displacement occasioned by the downward movement of the stem in the valve housing as the gate member is moved to the flowway-closing position, and will serve also to balance the fluid end forces acting on the stem in its movements from one position to the other, since the unit force transmitted to the lubricant by the piston will equal that of the line pressure acting on the stem.

When it is desired to replace packing 36, vent plug 58 may be removed. This will permit the lubricant to be bled off from the interior of the bonnet sufficiently to allow piston 46 to move to its uppermost position against shoulder 45, as shown in broken lines in FIG. 2 while maintaining a fluid-tight seal about stem 26 to exclude entry of line fluid into the upper bonnet portion. Packing gland 37 may now be removed and packing 36 replaced with complete safety whether gate member 23 is in the open or closed position.

The clearance provided by the greater length of the distance between shoulders 40 and 41 than the overall length of the bearing section carried by drive sleeve 29, provides a space through which lubricant can enter the interior of the bonnet from groove 54 when the stem is in the raised (valve-open) position shown in FIG. 1, at which the drive sleeve will be at its lowermost position. In the lowered position of the stem, as seen in FIG. 2, the drive sleeve will have moved to its uppermost position, bringing the upper face of upper bearing 43 against the opposed face of shoulder 41, thereby sealing-off groove 54 with the result that lubricant may be admitted into the bonnet only when the valve is in the open position. This provides a safety measure to prevent overfilling the bonnet with lubricant when the valve is in the closed position, which could prevent upward movement of the stem when it was desired to open the valve.

By providing the lubricant-immersed operating connection for the valve stem and the balancing of the fluid end forces on the stem, the torque requirements for operating the valve will be greatly reduced, thus permitting the use of minimal diameter for drive sleeve extension 32 with corresponding savings in cost of parts and other advantages which will be readily apparent to those skilled in the valve art.

It will be understood that various alterations and modifications may be made in the details of the illustrative embodiment within the scope of the appended claims but without departing from the spirit of this invention.

What I claim and desire to secure by Letters Patent is:

1. In combination with an enclosed rising-stem for a gate valve, a non-rising rotatable operator member supported axially by anti-friction bearings and having a threaded drive connection to said stem, a bonnet defining a lubricant-containing chamber surrounding said stem and operator member, packing means sealing said bonnet about said operator member above said drive connection, and seal means slidably disposed in said chamber about said stem below said operator member to form a movable sealing end wall confining the lubricant in said chamber and to prevent incursion of line fluid into said chamber, said seal means being movable in response to line pressure in the valve to automatically maintain uncontaminated lubricant about said stem and drive connection.

2. In the combination of claim 1, means including passage means communicating with said chamber for introducing lubricant therein, and means operable in response to the movement of said stem to one of its terminal positions to close off said passage means against introduction of said lubricant.

3. In the combination of claim 1, means for venting lubricant from said chamber.

4. In the combination of claim 1, stop means in said chamber in the path of movement of said seal means, and means for bleeding lubricant from said chamber whereby to permit movement of said seal means under line pressure into engagement with said stop means, to thereby permit servicing of said operator member and related parts while the gate valve is under line pressure.

5. In the combination of claim 1, said operator member comprising a generally cylindrical body having coaxial larger and smaller diameter portions, and said packing means sealing about said smaller diameter portion.

6. In a gate valve including a hollow housing having a flowway therethrough, and a gate member reciprocable in the housing between flowway-opening and -closing positions, a stem construction for reciprocating the gate member, comprising, a rising stem member operably connected to the gate member, a nonrising rotatable operator member supported axially by anti-friction bearings, threaded connector means operably connecting said operator member to said stem member, a bonnet carried by the valve housing enclosing said connector means and a portion of said stem member to define thereabout an annular chamber communicating with the interior of said housing, seal means slidably disposed in said chamber about said stem portion below said connector means to seal off said chamber from said housing, packing means sealing said bonnet about said operator member above said connector means, and a body of lubricant in said chamber between said packing means and said seal means, said seal means being movable in response to line pressure in said housing to automatically maintain a supply of uncontaminated lubricant about said stem and operator member and to balance the fluid end forces on said stem member.

7. In a gate valve according to claim 6, means including passage means communicating with said chamber for introducing lubricant therein, and means operable in response to the movement of said stem to one of its terminal positions to close off said passage means against introduction of said lubricant.

8. In a gate valve according to claim 6, wherein said seal means comprises an annular piston carrying internal and external seal packings sealingly engageable respectively with the exterior of said stem portion and the inner wall of said chamber.

9. In a gate valve according to claim 8, stop means in said chamber in the path of movement of said piston.

10. A gate valve according to claim 6, wherein said operator member and threaded connector means include an internally threaded sleeve member for threadedly receiving an externally threaded upper portion of said stem member, and wherein said bonnet is provided with an internal annular recess defined by longitudinally spaced shoulders, an annular flange on said operator member extending into said recess, and anti-friction bearings disposed between said flange and each of said shoulders.

11. A gate valve according to claim 10, wherein said operator member includes a cylindrical extension projecting through the upper end of said bonnet, and a stuffing box in the upper end of said bonnet surrounding said extension.

References Cited

UNITED STATES PATENTS

| | | | |
|---|---|---|---|
| 2,842,336 | 7/1958 | Johnson | 251—355 X |
| 3,064,674 | 11/1962 | Carfagna | 251—355 X |
| 3,107,685 | 10/1963 | Scaramucci | 251—355 X |

M. CARY NELSON, *Primary Examiner.*

MICHAEL O. STURM, *Assistant Examiner.*